Patented Feb. 12, 1952

2,585,478

UNITED STATES PATENT OFFICE 2,585,478

PRODUCTION OF OLEFIN OXIDES

Norman Levy, Norton-on-Tees, England, assignor to Imperial Chemical Industries Limited, a corporation of Great Britain No Drawing. Application December 28, 1949, Serial No. 135,529. In Great Britain January 13, 1949

7 Claims. (Cl. 260—348.5)

This invention relates to the production of ethylene oxide.

It has already been proposed to produce ethylene oxide by the reaction of ethylene with an oxygen-containing gas in the presence of a catalyst containing silver, the temperature being in the range of from 150° C. to 400° C.

We have now found that the extent of conversion of ethylene and the yield of ethylene oxide obtained in a process of the type above-described are greatly improved if provision is made in the silver-containing catalyst for the presence of a fused silica or quartz or of a silicate glass.

According to the present invention, therefore, there is provided a process for the production of ethylene oxide by reacting ethylene with oxygen-containing gas in the presence of a silver-containing catalyst in which the silver-containing catalyst also contains fused silica or quartz or a silicate glass. Preferably, the catalyst is a reduced silver oxide.

In this specification the term "conversion" refers to the percentage of ethylene which is destroyed during the reaction, while the term "yield" refers to the percentage of ethylene oxide produced based on the ethylene destroyed.

In general, the fused silica, quartz, or silicate glass will be present in powdered form in the catalyst, and may be present in quantities up to 10% by weight of the silver present therein.

The fused silica may be obtained from a variety of sources. For example it may be obtained by precipitation from sodium silicate solution, the precipitated silica then being filtered off, washed and fused.

If quartz is to be used, this can be obtained by crushing and grinding natural forms of quartz, such as flints, river- or sea-sand.

A wide variety of silicate glasses may be used, among which we have found that particularly satisfactory results are obtained by using borosilicates obtained by crushing up a glass which is sold under the registered trade name "Pyrex."

The catalyst may be supported or unsupported. It may be supported on firebrick or similar material, preferably having a particle size in the range $\frac{1}{16}''$ to $\frac{1}{2}''$. In this case, in order to give the required activity and specificity it is desirable that the powdered material should be present in a proportion of from 0.5 to 50%, and preferably from 0.5 to 10%, by weight of the active ingredient calculated as silver oxide ($Ag_2O$). If unsupported the active ingredient of the catalyst should be mixed with the powdered material, for example by mixing them together using methanol, and preferably acetone, as pasting medium.

The process may be carried out within a wide range of temperature, for example between 150° and 400° C. In general an increase in temperature is accompanied by an increase in the conversion of ethylene and a decrease in the yield of ethylene oxide. It is preferred to carry out the reaction in the temperature range of 200° to 300° C.

If desired the process may be carried out at elevated pressure, for example up to 50 atmospheres gauge, although satisfactory results are obtained at atmospheric pressure. If superatmospheric pressure is used it is preferred to employ less than 20 atmospheres gauge.

It is convenient to use air as the oxygen-containing gas but a reaction mixture containing concentrations of oxygen other than that given by the addition of air to the ethylene to be reacted may be used, for example inert gaseous diluents such as nitrogen may be provided in the reaction mixture. The proportion of ethylene in the initial gaseous reaction mixture may be within a wide range: satisfactory results have been obtained at moderate pressures with mixtures containing up to 20% by volume of ethylene. Similarly, the proportion of oxygen in the reaction mixture may be in a wide range, proportions up to 20% by volume having given satisfactory results. It is preferred to use an oxygen/ethylene molar ratio at least equal to 1.0. It is desirable to exercise careful control of temperature when using reactant mixtures having a composition falling within the explosive range.

Improved results are obtained by dispersing or pasting the catalyst with an organic liquid such as methanol, and preferably with acetone. In starting up the process a suitable procedure is to charge the reactor with catalyst still wet with acetone and to pass air, an inert gas or the reaction mixture itself through the catalyst and then to pass the reaction mixture through and maintain the temperature within the desired range.

The following record of experiments illustrates the advantages obtained when operating according to the process of the present invention.

A catalyst was prepared by mixing 20 parts by weight of silver oxide with acetone to make a paste, and this was mixed with 78 parts by weight of firebrick granules, having a particle size range $\frac{1}{8}''$ to $\frac{1}{4}''$. 2% by weight of the silica-containing additive in powdered form was then added to the mixture. The granules were charged into a reaction chamber and the residual acetone was removed by passing air through the chamber at a temperature of about 100° C. A gaseous mixture containing by volume 2.5% ethylene, 10% oxygen, and 87.5% nitrogen, was then passed through the chamber at a space velocity of 250 volumes of gas (measured at room temperature and pressure) per unit volume of catalyst space per hour, the temperature being maintained at 230° C. When the additive was silica a conversion of 83% was obtained, giving a yield of 65% of ethylene oxide, while when the additive was boron-silicate glass, the conversion was 62% and the yield 67%. When using a catalyst containing no additive as required by the process of the present invention, the conversion was only 52% and the yield 65%.

I claim:

1. A process for the production of ethylene oxide which comprises reacting in the vapor phase at a temperature of 150 to 400° C. a mixture of ethylene and an oxygen containing gas in which the proportion by volume of ethylene is up to 20% and of oxygen up to 20%, the molar ratio of oxygen to ethylene in the mixture being at least 1:1, in the presence of a silver-containing catalyst comprising separately prepared silver oxide in intimate admixture with from 0.5 to 50% of its own weight of a powdered material selected from the group consisting of fused silica and quartz, which powdered material is included within the intrinsic physical structure of the catalyst.

2. A process as defined in claim 1, wherein the catalyst is supported on a carrier.

3. A process as defined in claim 1, wherein the catalyst is unsupported by other material.

4. A process as defined in claim 1, wherein the proportion of silicious powdered material is from 0.5 to 10% of the silver oxide by weight.

5. A process as defined in claim 1, wherein the reaction temperature is from 200 to 300° C.

6. A process as defined in claim 1, wherein the process is carried out at super-atmospheric pressure not exceeding 20 atmospheres gauge.

7. A process as defined in claim 1 wherein the separately prepared silver oxide is in intimate admixture with about 2% of its own weight of said powdered material.

NORMAN LEVY.

REFERENCES CITED

The following references are of record in the file of this patent:

UNITED STATES PATENTS

| Number | Name | Date |
|---|---|---|
| 2,279,470 | Law | Apr. 14, 1942 |
| 2,424,084 | Finch | July 15, 1947 |
| 2,430,443 | Becker | Nov. 11, 1947 |
| 2,437,930 | Bergsteinsson | Mar. 16, 1948 |
| 2,458,266 | Heider | Jan. 4, 1949 |